United States Patent [19]

Kleinschnitz

[11] Patent Number: 5,546,315
[45] Date of Patent: Aug. 13, 1996

[54] SIMPLIFIED STORAGE MEDIA LIBRARY SUBSYSTEM

[75] Inventor: Donald J. Kleinschnitz, Louisville, Colo.

[73] Assignee: Storage Technology Corporation, Louisville, Colo.

[21] Appl. No.: 206,537

[22] Filed: Mar. 4, 1994

[51] Int. Cl.$^6$ .................................................. G06F 13/00
[52] U.S. Cl. .................. 364/478.06; 369/34; 364/478.03
[58] Field of Search .............................. 364/478; 369/34, 369/36, 191, 192; 360/92, 98.06, 98.04, 178, 98.05; 235/385, 375; 371/66

[56] References Cited

U.S. PATENT DOCUMENTS

| | | | |
|---|---|---|---|
| 4,864,438 | 9/1989 | Munro et al. | 360/92 |
| 4,907,889 | 3/1990 | Simone | 360/92 |
| 4,945,429 | 7/1990 | Munro et al. | 360/92 |
| 4,979,135 | 12/1990 | Moy | 364/571 |
| 5,019,927 | 5/1991 | Simone | 360/92 |
| 5,121,483 | 6/1992 | Monahan et al. | 395/275 |
| 5,132,949 | 7/1992 | Choi | 369/37 |
| 5,164,909 | 11/1992 | Leonhardt et al. | 364/478 |
| 5,197,055 | 3/1993 | Hartung et al. | 369/34 |
| 5,285,333 | 2/1994 | Barr et al. | 360/92 |
| 5,291,001 | 3/1994 | Krayer et al. | 235/375 |
| 5,303,214 | 4/1994 | Kulakowski et al. | 369/34 |
| 5,341,258 | 8/1994 | Chalmers et al. | 360/92 |
| 5,343,403 | 8/1994 | Berdle et al. | 364/478 |
| 5,377,121 | 12/1994 | Dimitri et al. | 364/478 |
| 5,386,516 | 1/1995 | Monahan et al. | 395/275 |

FOREIGN PATENT DOCUMENTS

| | | | |
|---|---|---|---|
| 0288165A2 | 10/1988 | European Pat. Off. | G11B 15/68 |
| 3612531A1 | 11/1988 | Germany | G11B 15/68 |
| 4208596A1 | 9/1993 | Germany | G11B 15/68 |
| 62-14364(A) | 1/1987 | Japan | G11B 15/68 |
| 3-260951(A) | 11/1991 | Japan | G11B 15/68 |
| WO90/07182 | 12/1989 | WIPO | G11B 15/68 |

OTHER PUBLICATIONS

Kazami, K. and H. Itoh, "Automatic Storage and Retrieval of Videotaped Programs," SMPTE Journal, vol. 88, No. 4, Apr. 1979.

*Primary Examiner*—James P. Trammell
*Attorney, Agent, or Firm*—Duft, Graziano & Forest, P.C.

[57] ABSTRACT

The present invention discloses a storage library subsystem which utilizes robotic arm mechanisms to move storage media cartridges between inventory storage locations and read/write devices. This library subsystem simplifies the motion required of the robotic arms to reduce the complexity of the robotic mechanisms and thereby reduce the complexity, size and cost of the library subsystem. One factor in simplifying the robotic motion is the use of higher density storage media cartridges. Higher density cartridges enables a corresponding reduction in the total number of media cartridges inventoried and the total range of motion required of the robotic arm. Another factor in simplifying the robotic motion is the placement of media cartridges in vertically aligned columns around the circumference of a rotating cylindrical carousel. The carousel may be rotated to vertically align a column of storage media cartridges with a read/write device below in the same vertical plane. This configuration permits the robotic arm to access both the storage media cartridges and the read/write devices without the need for rotational movement. Another simplification of the subsystem is realized by limiting human access to the internal inventory of the library. The inventory may be accessed by a human operator during normal operation only by library controlled access through a Cartridge Access Port (CAP). Only certain reserved positions on the rotating carousel will be available at the CAP when the library unlocks the door covering the CAP. By limiting human operator access to the library inventory the present invention eliminates the need for complex components such as vision systems to update library inventory following human intervention. Alternative exemplary embodiments restore some limited rotational movement to the robotic arm to enable a single arm to service multiple carousels or read/write/drives.

19 Claims, 11 Drawing Sheets

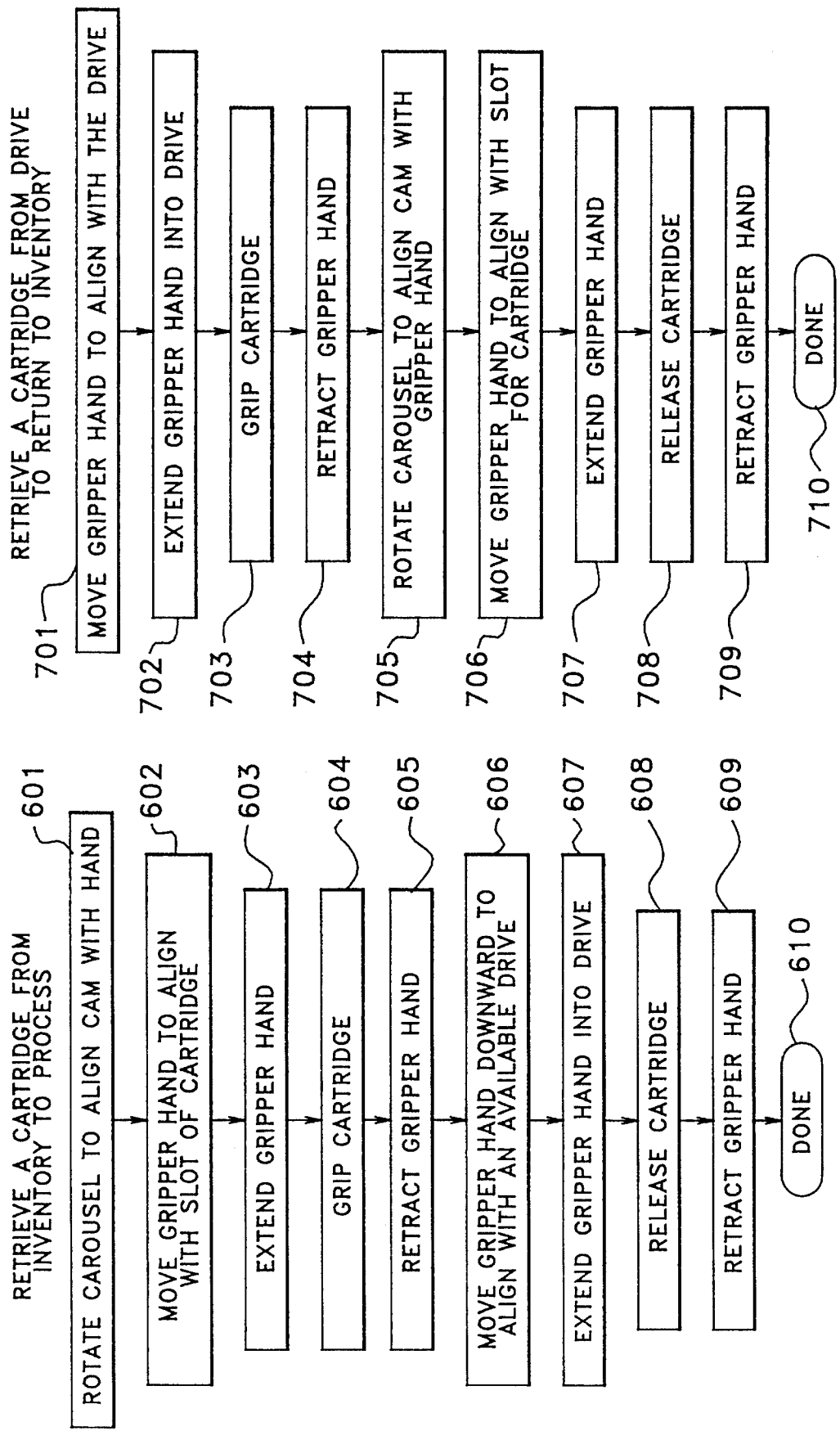

SIMPLIFIED STORAGE MEDIA LIBRARY SUBSYSTEM

BACKGROUND OF THE INVENTION

1. Field of the Invention

This invention relates to storage media library subsystems as frequently found in computer mass storage applications. More specifically, this invention comprises improvements and simplifications that enable reductions in the size and complexity of storage media library subsystems.

2. Statement of the Problem

Storage library subsystems are commonplace in high volume computer storage applications. Such library subsystems permit the use of lower cost per byte storage devices (such as high density tape storage) but retain automated access to storage media through the use of robotic retrieval mechanisms. Robotic mechanisms in this context typically constitute an arm capable of moving in three dimensions. The arm moves vertically to align itself with storage media cartridges at various heights in inventory storage of the library. The arm has a gripping hand attached to its end that extends horizontally to permit the hand to grip or release a media cartridge. The typical arm also rotates to position itself as required to retrieve a particular media cartridge or to deposit a previously retrieved media cartridge back into inventory.

Large numbers of storage media cartridges are stored in inventoried locations within the library subsystem. Robotic arm mechanisms store and retrieve the media cartridges in the inventoried locations as requested by a host computer system. On request from a host computer system, the library robotic mechanism retrieves a required storage media cartridge from an inventoried location, moves the media cartridge to a read/write device for processing of the media cartridge and deposits the media cartridge in the read/write device. Similarly, on command from a host computer system, the robotic arm retrieves the media cartridge from the read/write device and returns the media cartridge to the inventoried location for storage.

Library subsystems have become an important component in Hierarchical Storage Management (hereafter HSM) subsystems. HSM subsystems utilize control mechanisms and algorithms to provide mass storage of information across a broad range of price/performance storage media. At the high end of the performance spectrum, rotating disks often referred to as Direct Access Storage Devices (hereafter DASD) provide rapid random access to a relatively small volume of stored information. At the lower end of the performance spectrum, devices such as library subsystems provide access to much larger volumes of stored information but are substantially slower to access. In general, the higher speed lower volume DASD devices are more costly per stored byte than are the slower speed higher volume tape storage devices. HSM subsystems control storage devices of many types; higher speed lower density and higher cost, through lower speed higher density and lower cost. HSM subsystems manage the collection of storage devices so that a host computer system views the HSM subsystem as a single, large, seamless linear array of storage rather than individual storage devices requiring different control algorithms and timing.

HSM subsystems automatically migrate information from higher cost higher speed devices to lower cost lower speed devices as space and utilization so require. Infrequently accessed information stored on higher speed DASD is migrated by HSM control logic to slower speed lower cost per byte storage devices such as tape or optical disk. Conversely, frequently accessed information stored on lower speed tape devices is migrated by the HSM control logic to higher speed DASD. This migration of information is done in a manner which is hidden from the user at a host computer system and maintains the appearance at the host computer interface of a single, large, seamless linear array of storage. The computer user will typically not require specific knowledge of the location of the requested information. The HSM subsystem locates and retrieves the desired information from whichever medium has it currently stored. The only observable difference to a user at a host computer system is the speed with which the data is accessed. Frequently accessed information will be available more rapidly than less frequently accessed information.

Despite "downsizing" and "client/server model" networking of computer applications in the computer industry, library subsystems have remained large and complex. The size and costs of such library subsystems have been a substantial factor in precluding them from new markets. In particular, HSM subsystems are a fraction of the size and mechanical complexity of current library storage subsystems. This size and complexity has precluded use of current library subsystems in "downsized" networked computing environments. Several problems with current library subsystems are factors in their large size and complexity.

The size of current library subsystems is in part due to the capacity of storage media utilized. Lower density storage media requires a larger number of storage media cartridges to attain a useful total storage capacity for the library. This larger number of storage media cartridges requires, in turn, a broader range of motion for the robotics utilized to retrieve the media cartridges. This broad range of motion (usually in three dimensions) coupled with the precise positioning required to grip a media cartridge has been the impetus for the complex robotic mechanisms found in prior storage library subsystem designs. The STK ACS4400 library subsystem, as an example, utilizes a complex computerized vision system to precisely position a large robotic arm over a broad range of motion in three dimensions to grip a small storage media cartridge.

Another complexity of current library subsystems stems from the need for maintaining an accurate inventory of the library contents. Some library subsystems of prior design permit unlimited operator access to cartridges inventoried within the library. Human operator access is the only practical approach to mass loading of the room sized device of prior designs. Prior designs of storage libraries require significant time following such human operator access to verify the library inventory. The aforementioned computer vision system (or in other designs, a bar code reader) attached to the robotic arm mechanism is operated to re-read the labels of every storage media cartridge following such human operator access. During this time consuming inventory process the library subsystem is unavailable.

3. Solution to the Problem

The present invention solves the above problems and others and advances the art by providing a smaller simpler library subsystem. The smaller size, reduced complexity and the resulting reduced costs make the library subsystem of the present invention an appropriate device for HSM subsystems in the "downsized" "client/server model" network computing environment. In one exemplary embodiment of the present invention, the HSM controller subsystem and the associated storage media devices may be integrated within the same small cabinet of the library subsystem of the present invention.

The present invention utilizes high density storage media cartridges (such as high density tape cartridges) to reduce the total number of media cartridges required to achieve a useful library subsystem storage capacity. In addition, the media cartridges are stored in inventory slots in Cartridge Access Magazines (hereafter CAMs). The CAMs store several media cartridges in slots aligned in a vertical column. The CAMs hang on the facets of a multi-sided cylinder and are lifted off to remove the CAM with its media cartridges from the library subsystem. The multi-sided cylinder is rotatable such that any one of the magazines hanging on a face of the cylinder may be positioned in the plane of the robotic arm. The slots in the CAMs are angled such that the rear part of the slot is tilted downward relative to the front part. This tilt helps retain the cartridges within the slots of the CAM as the carousel is rotated. This combination of a reduced number of higher density storage media cartridges and the rotating carousel reduces the range of motion required of the robotic mechanisms to reach each media cartridge.

In the simplest embodiment of the present invention, the robotic arm mechanism need move in only two dimensions to reach every media cartridge as well as the read/write devices. The robotic arm is controllably moved in the vertical dimension to position itself at each media cartridge slot in a CAM. The gripping hand at the end of the arm is extended from the arm in a horizontal plane to permit the hand to grip and extract a media cartridge or to deposit and release a media cartridge. The rotation of the carousel provides the third dimension of motion. This simplified two dimensional motion of the robotic arm coupled with the reduced range of motion to reach each media cartridge enables reduced complexity in the design of the robotic mechanism. Vision systems as used in past designs are no longer required to position the robotic arm mechanism. Instead, simple mechanical detents or servo motors are used to move the robotic arm to each storage media cartridge inventory location.

Past designs also used a vision system to inventory media cartridges stored in the library subsystem. A simpler bar code scanning device attached to the robotic arm replaces the complex vision systems of past designs. This bar code scanner provides a simple mechanism to automatically control the media cartridge inventory within the library subsystem.

Other embodiments of the present invention contemplate a single robotic arm capable of moving to one of multiple rotating carousels. This motion of the robotic arm remains simpler than past designs in that simple mechanical detents or servo motors can easily position the robotic arm. The need for complex vision systems to accurately position the robotic arm to a single media cartridge is eliminated in favor of simpler robotic arm motion.

Another feature of the present invention is a Cartridge Access Port (hereafter CAP). The CAP is an access port with a door that is controllably lockable by the control logic of the library subsystem. Unlike past designs, the storage library of the present invention is intended to eliminate human operator access to the inventory locations within the library (except in an "off-line" service mode). The intended mode of operator access to the inventoried media cartridges is through the CAP. One of the several CAMs hanging from the carousel is reserved for operator access through the CAP.

No media cartridges are stored in the reserved CAM for inventory storage within the library. A human operator requests that the library subsystem retrieve a particular media cartridge (or group of media cartridges) for removal from the library subsystem. In response, the library subsystem rotates the carousel and activates the robotic arm to fetch the desired media cartridge. Next, the carousel is rotated to align the reserved CAM with the robotic arm and the retrieved media cartridge is deposited in an empty position of the reserved CAM. The carousel is then rotated so that the reserved CAM is aligned with the CAP. A lockable door on the CAP is then unlocked by the library subsystem to permit the operator to remove the retrieved media cartridge. In a similar manner, the operator may request that the CAP door be unlocked so that the reserved CAM may be filled with new media cartridges to be added to the library inventory. The CAP door is again locked after the operator indicates the reserved CAM is filled and the library subsystem moves the new media cartridges from the reserved CAM into empty inventory locations of the non-reserved CAMs. The apparatus and methods of the present invention limit operator access to the cartridges without the addition of another mechanism as found in some prior designs. The operator accesses the cartridges in the carousel directly through the unlocked CAP door without the addition of another transfer mechanism as found in prior designs. However, that access is limited to the cartridges in the reserved CAM aligned with the CAP while the CAP door is unlocked. The present invention assures the integrity of the library inventory by limiting human operator access to the storage media cartridges. This limited operator access reduces the need for time consuming inventory checking as recited in prior designs following human operator access.

Another feature of the present invention is manifested in the placement of the carousel with respect to the read/write devices. The read/write devices are placed under the carousel aligned with the vertical plane of movement of the robotic arm mechanism. This positioning permits the robotic arm to move media cartridges between their inventoried locations in the CAMs hanging on the cylindrical carousel with only the simple two dimensional motions of the arm as described above. This design also improves the location of the CAMs on the carousel relative the height of an average operator as well as the weight distribution of components within the library subsystem.

Alternative exemplary embodiments of the present invention add limited simple rotational movement of the robotic arm. Such simple rotation of the robotic arm enables one robotic arm to rotate between two or more positions. Each such rotational position is aligned to service CAMs on a different carousel. This rotational movement permits a single robotic arm to service multiple carousels while retaining simplicity of robotic motion as compared to the broad range of motion required of prior designs.

Yet another feature of the present invention is the integration of Local Media Storage racks within the cabinet panels of the storage library. This Local Media Storage, (hereafter called LMS), provides a convenient storage area for CAMs or storage media cartridges which may be frequently requested by host computer systems. A manually operated bar code reader connected to the library subsystem control electronics provides semi-automatic inventory management of media cartridges and CAMs stored outside the robot controlled inventoried locations of the library subsystem. The library control electronics can inform the operator of the probability that a desired media cartridge or CAM is in the LMS racks. This semi-automatic location of media cartridges and CAMs assists the human operator in rapidly locating a media cartridge or CAM requested by a host computer system.

The CAMs and robotic gripping hand of the present invention permits the use of various types of storage media cartridges. Tape cartridges, CDROM cartridges, rewritable optical disc cartridges, Write Once Read Many disk cartridges (hereafter referred to as WORM cartridges), miniature disk array cartridges, and other potential storage media cartridges are manipulated by the robotics of the present invention and inventoried in slots of CAMs of the storage library subsystem. The storage library subsystem of the present invention includes a gripper hand capable of gripping such a variety of media cartridges. Furthermore, the present invention comprises read/write devices to manipulate the various cartridge and media formats. Additionally, the physical orientation of the media cartridges within the slots of the CAMs may be varied with an appropriately adapted gripper hand to permit a broader variety in the types of media cartridges stored within the library subsystem.

The simple design and small size of the storage library of the present invention enables cost effective, high capacity, low cost information storage libraries to be used in HSM subsystems of current client/server network computing environments.

BRIEF DESCRIPTION OF THE DRAWING

FIG. 6 shows the control function to retrieve a media cartridge from inventory for processing;

FIG. 7 shows the control function to return a processed media cartridge to inventory;

DESCRIPTION OF THE PREFERRED EMBODIMENT

Storage Library Subsystem

Figure 1:
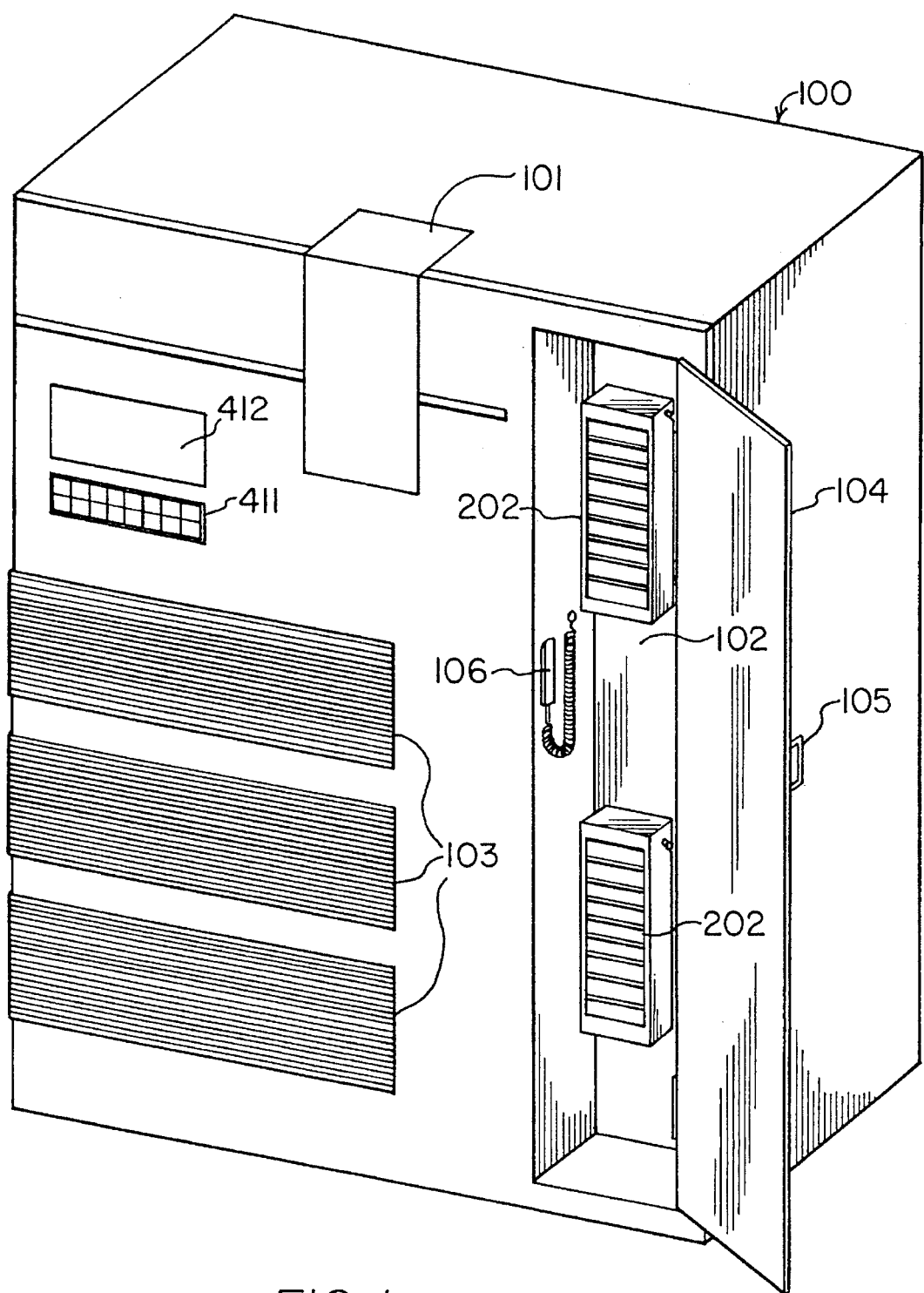
FIG. 1 is a perspective view of one possible exemplary preferred embodiment of the storage library of the present invention.

FIG. 1 depicts a perspective view of one possible exemplary embodiment of the storage library 100 of the present invention. Cartridge Access Port (CAP) is shown in FIG. 1 as a hole at the top from of storage library 100 covered by CAP door 101. CAP door 101 is depicted as a sliding door made of plexiglass or other material. Control electronics (208 of FIG. 2) applies signals to a control bus (413 of FIG. 4) to actuate solenoid lock mechanism (214 of FIG. 2) to lock or unlock CAP door 101 while it is in the closed position. A human operator may slide the CAP door 101 open only when the door is unlocked by control electronics 208. A human operator may remove or insert a Cartridge Access Magazine (CAM not shown in FIG. 1) only when CAP door 101 is opened. A CAM may contain several media cartridges (not shown). Each media cartridge is housed in a slot in a CAM. Slots may be adapted to house media cartridges having a variety of form factors and information storage formats. A human operator may remove media cartridges from, or add media cartridges to, storage library 100 by removing or inserting media cartridges in the CAM through CAP door 101. The operator may also remove the entire CAM through CAP door 101 and insert a new CAM to add or remove cartridges in storage library 100.

Figure 2:
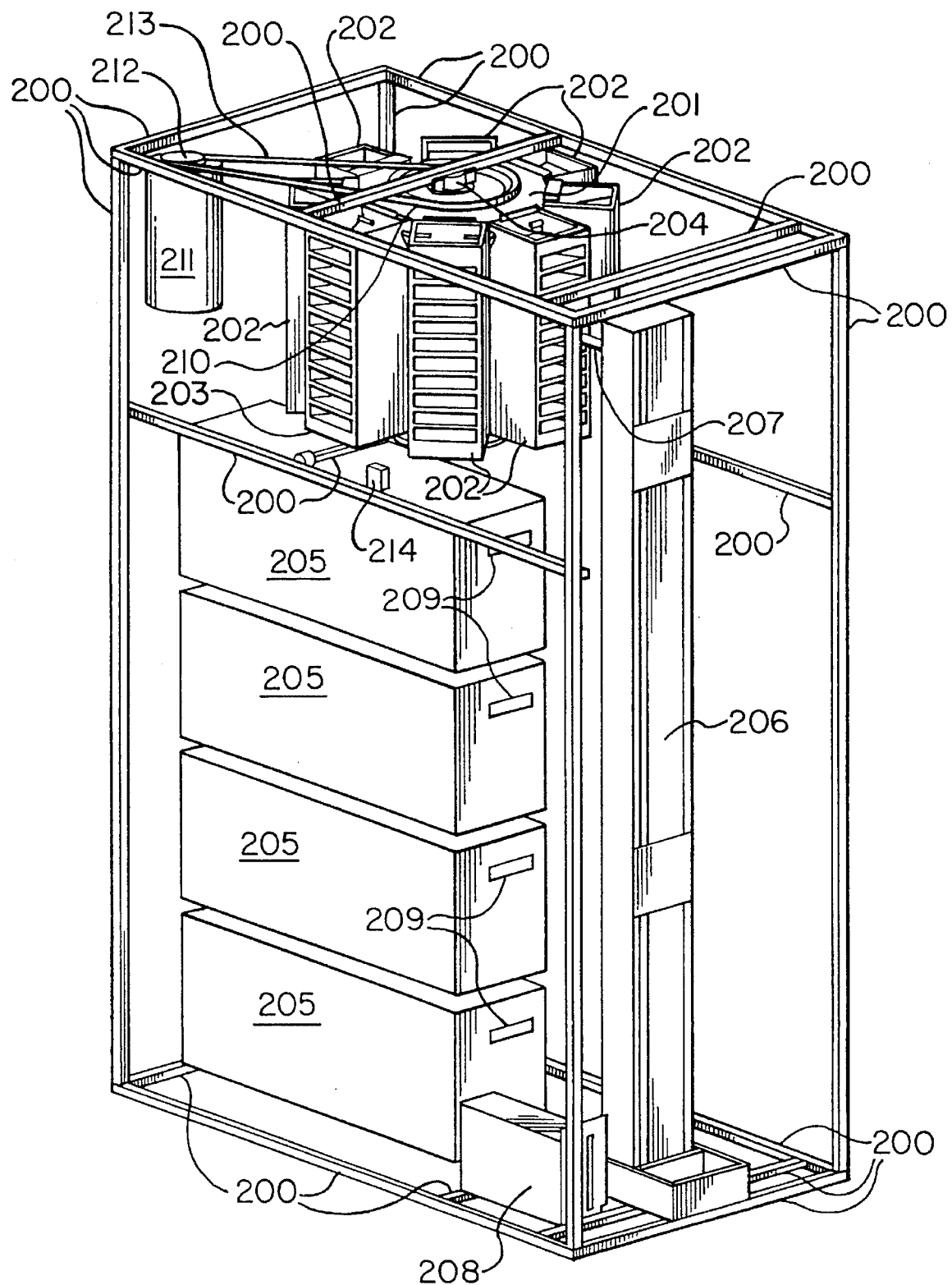
FIG. 2 shows the same storage library as FIG. 1 with the exterior covers and CAP door removed for clarity of the carousel, electronic read/write devices and robotic arm.

FIG. 2 depicts the same perspective view of storage library 100 with all outer covers removed. Frame elements 200 are the structural frame members which connect and support outer covers (shown in FIG. 1) and all internal components of storage library 100. Carousel 201 is shown with eight vertical faces equally spaced around its center vertical axis 204. Any number of faces on carousel 201 may be utilized within the spirit of the present invention. Carousel 201 rotates around axis 204 supported by frame elements 200 on the top of axis 204 and the frame element 200 on the bottom of axis 204 (not shown). CAMs 202 are hung from seven of the eight faces of carousel 201. Reserved CAM 203 hangs on the eighth face of carousel 201. Reserved CAM 203 is identical to CAMs 202 in all physical respects. Control electronics 208 assigns any of the eight possible faces of carousel 201 to be the position of reserved CAM 203. Reserved CAM 203 is reserved in that it is the only CAM which can be positioned, as depicted in FIG. 2, aligned with CAP door 101 of FIG. 1 when CAP door 101 is unlocked to permit operator access. CAMs 202 of FIG. 2 are never directly accessed by a human operator through CAP door 101 of FIG. 1. Reserved CAM 203 never contains media cartridges in use from the inventory of storage library 100. Instead, reserved CAM 203 is used only as a temporary holding position for media cartridges being moved into or out of library inventory by operator request to control electronics 208. Control electronics 208 actuates solenoid lock mechanism 214 to controllably lock or unlock CAP door 101.

A servo motor 211 drives belt gear 212, belt 213 and belt gear 210 to controllably rotate carousel 201. Control electronics 208 activates servo motor 211 to position one of CAMs 202 or reserved CAM 203 in alignment with robot gripper hand 207 of FIG. 2 or to align reserved CAM 203 with CAP door 101 of FIG. 1.

Robot gripper hand 207 slides vertically on robot z-axis support 206 of FIG. 2. Details of the controls and motion associated with robot gripper hand 207 are discussed below with reference to FIG. 3. Control electronics 208 of FIG. 2 controllably moves robot gripper hand 207 vertically up and down on robot z-axis support 206 to align robot gripper hand 207 with any one of the slots in CAMs 202 (or reserved CAM 203) currently rotated into alignment with robot gripper hand 207. This vertical positioning permits robot gripper hand 207 to retrieve a media cartridge from a slot in the currently aligned CAM 202 (or reserved CAM 203) or to deposit a media cartridge into a slot in the currently aligned CAM 202 (or reserved CAM 203). In addition, control electronics 208 may controllably move robot gripper hand 207 vertically on robot z-axis support 206 to align robot gripper hand 207 with one of cartridge loading slots 209 in one of read/write devices 205. This vertical positioning permits robot gripper hand 207 to retrieve a media cartridge from one of read/write devices 205 or to deposit a media cartridge into one of read/write devices 205 for further processing.

Robotic Mechanisms

Figure 3:
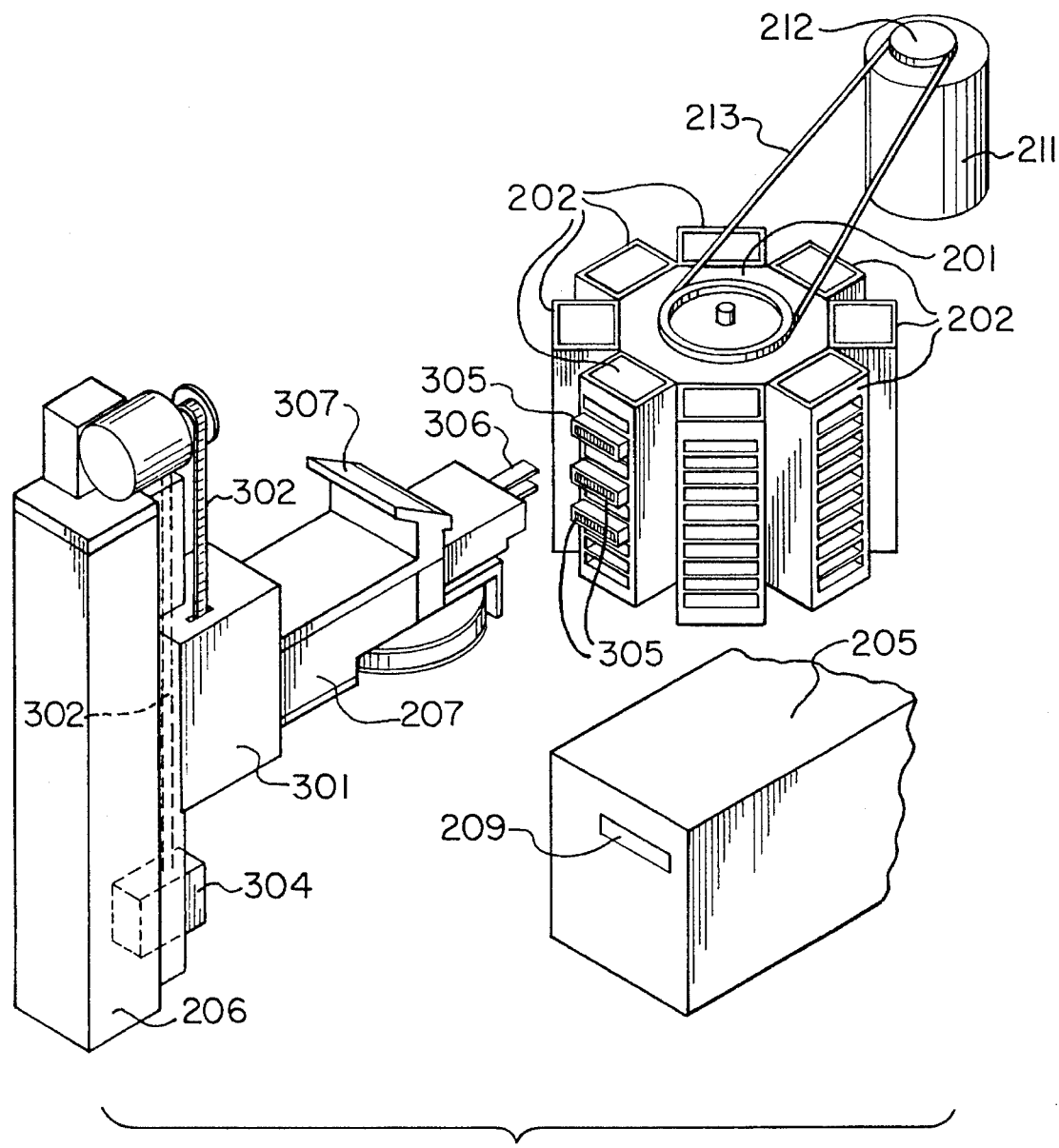
FIG. 3 shows more detail of the same robotic arm and carousel depicted in FIG. 2.

FIG. 3 depicts additional detail of the operation and relative positioning of robot gripper hand 207, robot z-axis support 206, carousel 201 and read/write device 205. Servo motor 303 of FIG. 3 controllably turns to move belt 302 and attached gripper hand support 301 up or down as directed by control electronics 208. When servo motor 303 turns clockwise, gripper hand support 301 with attached robot gripper hand 207 is moved upward on robot z-axis support 206. Conversely, counterclockwise rotation of servo motor 303 moves gripper hand support 301 and robot gripper hand 207 downward on robot z-axis support 206. Counterweight 304 helps balance the load of gripper hand support 301 and robot gripper hand 207 against servo motor 303.

Control electronics 208 moves robot gripper hand 207 and controllably extends or retracts gripper jaws 306 to move storage media cartridges between inventory locations in CAMs 202 and reserved CAM 203 or between CAMs 202 and read/write devices 205. Details of design and operation of robot gripper hand 207 and gripper jaws 306 are well known in the art. Co-pending U.S. patent application Ser. No. 08/139,199, filed Oct. 20, 1993 by Timothy C. Ostwald, U.S. Pat. No. 5,418,664, is representative of a robot gripper hand which may be advantageously applied to the library subsystem of the present invention. Other gripper hands such as those disclosed in U.S. Pat. No. 4,908,777 issued Mar. 13, 1990 to Samuel J. Wolfe or U.S. Pat. No. 5,253,911 issued Oct. 19, 1993 to Brian P. Egan may be advantageously applied to the present invention for manipulating storage media cartridges. Bar code scanner 307 of FIG. 3 is affixed to robot gripper hand 207 and controlled by control electronics 208 of FIG. 2 to permit control electronics 208 to read bar coded labels from each media cartridge 305 stored in slots of CAMs 202 or reserved CAM 203. Bar code scanner 307 is used to verify and record the inventory of media cartridges within storage library 100. Bar code labels on each media cartridge 305 are used in part to uniquely identify each media cartridge.

Control electronics 208 moves robot gripper hand 207 with attached bar code scanner 307 vertically up and down on z-axis support 206. Robot gripper hand 207 is affixed to gripper hand mount 301 which, in turn, is slidably attached to robot z-axis support 206. As discussed above, control electronics 208 controls servo motor 303 to slide robot gripper hand 207 to align robot gripper hand 207 with any slot in CAM 202. CAM 202 is rotated on carousel 201 to align with robot gripper hand 207. Additionally, control electronics 208 of FIG. 2 may slide robot gripper hand 207 downward to align with cartridge loading slot 209 of read/write device 205. This permits robot gripper hand 207 to retrieve a media cartridge from or deposit a media cartridge into read/write device 205.

Control Electronics

Figure 4:
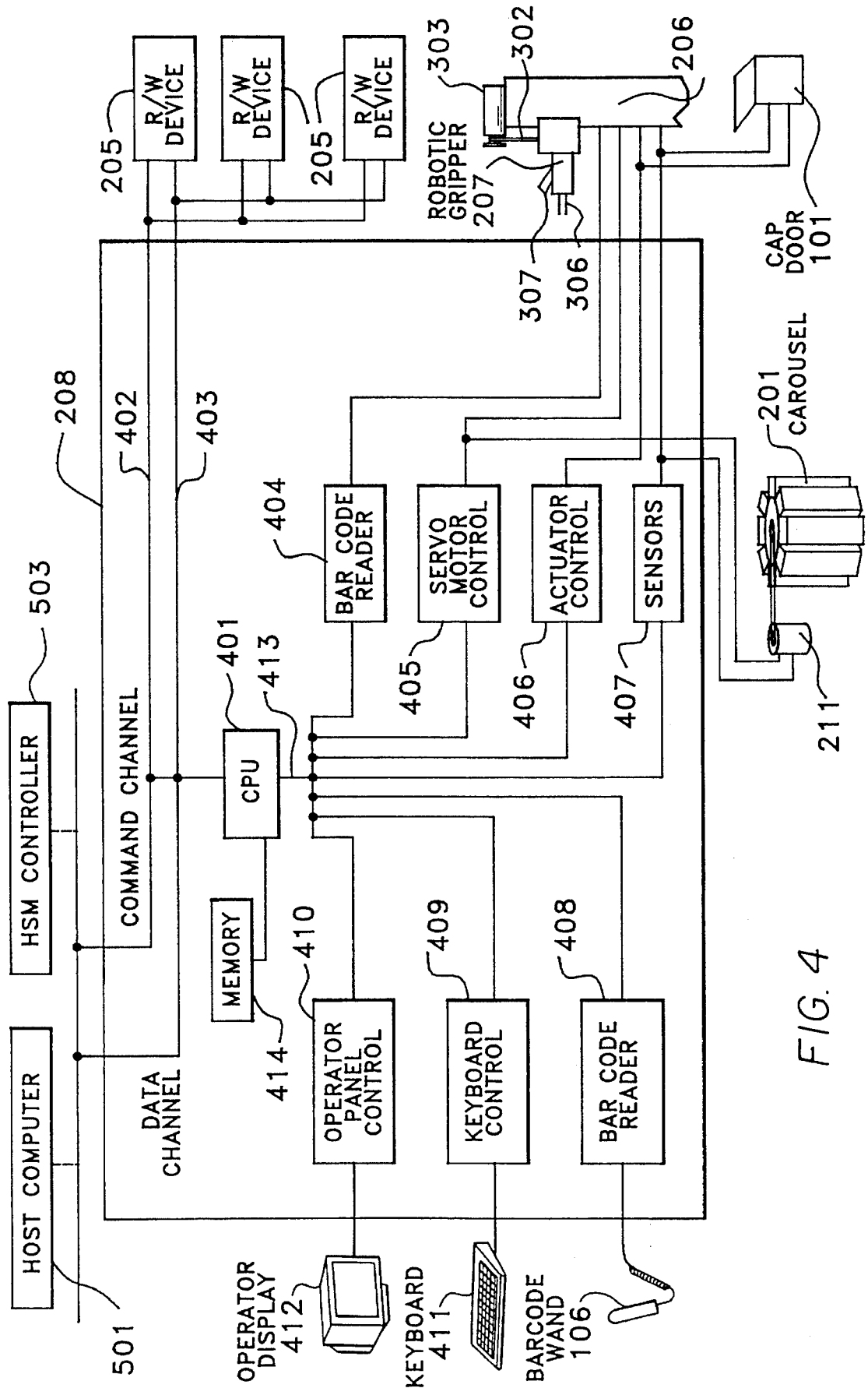
FIG. 4 is a block diagram of the control electronics within the storage library of the present invention.

FIG. 4 depicts a block diagram of control electronics 208 of FIG. 2. CPU 401 and read/write devices 205 receive command information from host computers 501 or HSM controller 503 and return status information over command channel 402. Data transferred between a host computer 501 or HSM controller 503 and storage media cartridges processed by read/write devices 205 is transferred over data channel 403. CPU 401 controls operation of the library subsystem by applying and sensing signals on bus 413. Operator panel control 410 and operator panel 412 are used to communicate instructions and status to a human operator. Keyboard control 409 and keyboard 411 are used to receive command input from a human operator. Bar code reader 408 and bar code wand 106 are used to read labels from media cartridges stored in CAMs within Local Media Storage 102 of FIG. 1. Further details regarding Local Media Storage 102 and bar code wand 106 are discussed below.

CPU 401 controls operation of robotic mechanisms of the library subsystem over bus 413. Bar code reader 404 is used with bar code scanner 307 to create and verify the inventory of media cartridges within storage library 100 when new media cartridges are added by a human operator through CAP door 101. Bar code scanner 307 is affixed to robot gripper hand 207 so that as robot gripper hand 207 is positioned to retrieve a media cartridge, bar code scanner 307 can verify the identity of the media cartridge by reading the bar code label on the media cartridge. CPU 401 uses bar code reader 404 and bar code scanner 307 to read each media cartridge label as new media cartridges are added to inventory by a human operator through CAP door 101. CPU 401 records the label information read and the ultimate inventory location for the media cartridge in memory 414. When a host computer system requests a particular media cartridge by identifying the label information, CPU 401 looks up the inventory location in memory 414 and controls the robotic mechanisms of storage library 100 to retrieve the media cartridge for processing in a read/write device 205.

CPU 401 controls servo motor 303 of FIG. 3 and servo motor 211 through commands sent to servo motor control 405 over bus 413. Servo motor 303 is activated to slide robot gripper hand 207 vertically up or down on robot z-axis support 206 to align robot gripper hand 207 with a slot in a CAM 202 or with a cartridge loading slot 209 in a read/write device 205. Servo motor 211 is activated to rotate carousel 201 to align a CAM 202 with robot gripper hand 207 or to align reserved CAM 203 with CAP door 101.

CPU 401 senses positions of robotic mechanisms of storage library 100 by reading information from sensors 407 as well as the servo encoder mechanisms of servo motors 303 and 211. Sensors 407 can sense whether CAP door 101 is opened or closed. Additionally, sensors 407 can sense the top and bottom vertical motion limits of robot gripper hand 207 on robot z-axis support 206. Sensing the position of CAP door 101 is useful for CPU 401 to determine when carousel 201 may safely be rotated without interference from or harm to a human operator. CPU 401 will only rotate carousel 201 when CAP door 101 is closed and locked. Sensing the position of robot gripper hand 207 or carousel 201 is useful for CPU 401 to calibrate the operation of servo motors 303 and 211.

CPU 401 controls gripper jaws 306 and CAP door lock (not shown) through commands sent to actuator control 406 over bus 413. Actuator control 406 may controllably lock or unlock CAP door 101. A human operator is permitted to access reserved CAM 203 through CAP door 101 only when CPU 401 unlocks CAP door 101. At all other times CAP door 101 remains locked to prevent human operator access to the CAMs and to prevent harm to the operator from the rotation of carousel 201. CPU 401 also causes gripper jaws 306 to be extended, retracted, opened or closed by activating actuators (not shown) through commands sent to actuator control 406 over bus 413.

Typical Applications

Figure 5:
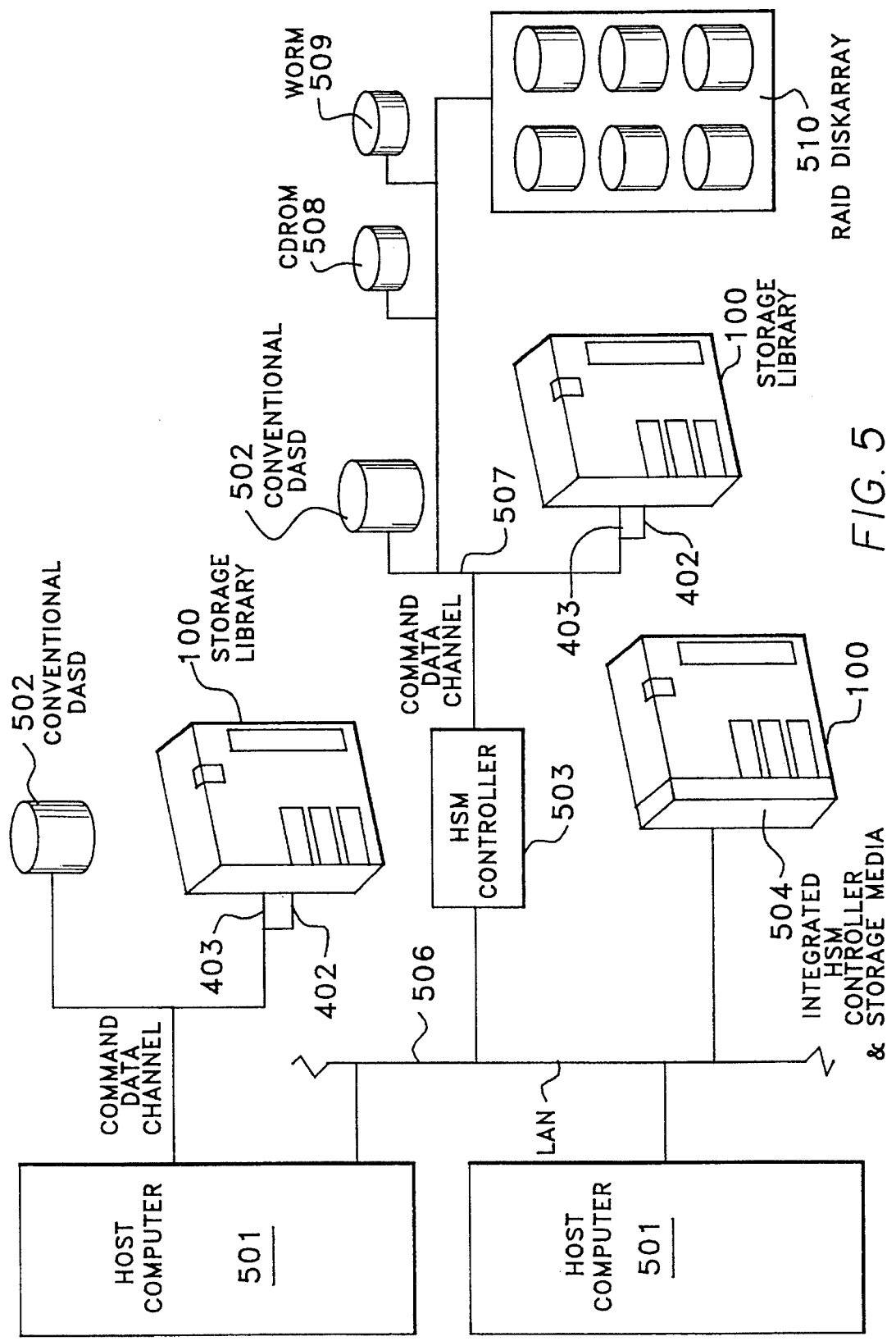
FIG. 5 is a block diagram of several possible applications of the storage library of the present invention as compared to conventional DASD or HSM subsystems.

FIG. 5 shows various alternative applications for a storage library subsystem of the present invention. A host computer 501 may attach directly to storage library 100 as it would other conventional DASD 502 or other mass storage devices. Command/data channel 505 is used for bi-directional transmission of command, status and data between host computer 501 and data storage peripherals conventional DASD 502 and storage library 100.

Alternative applications of the present invention attach a storage library 100 of the present invention to a host computer 501 through a Hierarchical Storage Management (HSM) controller 503. HSM controller 503 connects to host computers 501 over Local Area Network 506 (hereafter LAN). In a "client/server" computing environment, HSM controller 503 provides file services to client programs running on host computers 501. HSM controller 503 determines where information is best stored based on records of past accesses from host computers 501. Frequently accessed information will be moved by HSM controller 503 onto high speed, low capacity storage devices such as conventional DASD 502 or RAID Disk Array 510. As more space is required on such rapid access storage devices, less frequently accessed information will be moved off conventional DASD 502 or RAID Disk Array 510 onto medium speed, medium capacity CDROM drives 508 or WORM cartridge drives 509. Similarly, as these storage media devices are filled, infrequently accessed information is moved by HSM controller 503 into low speed, high capacity storage library 100. This migration of information between storage devices occurs automatically as HSM controller 503 deems it necessary to optimize response time for servicing requests of client programs running in host computers 501. Client programs running in host computers 501 have no need of detailed knowledge as to where HSM controller 503 has chosen to store information. Rather, client programs simply request that information be stored or retrieved by HSM controller 503. Requests for information simply take more or less time to complete depending on how HSM controller 503 has chosen to distribute the information across the various storage media devices.

In one alternative application, an HSM controller 503 is attached to several host computers 501 over a Local Area Network 506 (hereafter LAN). The HSM controller 503 attaches to mass storage peripheral devices such as conventional DASD 502, CDROM drives 508, WORM cartridge drives 509, RAID Disk Arrays 510, or a storage library 100 of the present invention over command/data channel 507.

Another exemplary application of the present invention discloses an integrated HSM controller and storage media 504 physically integrated with storage library 100. HSM controller 503, conventional DASD 502, CDROM drives 508, WORM cartridge drives 509, RAID Disk Array 510 and command/data channel 507 are all embodied within integrated HSM controller and storage media 504 and integrated with the cabinets of storage library 100. This packaging option helps to minimize the space required for an HSM subsystem to a size commensurate with the needs of the "downsized" network computing environment.

Control Procedures

Combinations of the robotic motions described above are useful under the direction of control electronics 208 of FIG. 2. Note that in all the following exemplary sequences of operations, sequential steps involving rotation of carousel 201 and vertical movement of robot gripper hand 207 may overlap to reduce the total elapsed time for completion. If these operations do overlap it is presumed that they both complete before the next sequential step initiates it action. Typical operations are as follows:

To retrieve a media cartridge from inventory to begin processing in one of read/write devices 205, the elements as depicted in FIG. 6 are:

Element 601 rotates carousel 201 to align the CAM 202 containing the desired media cartridge with robot gripper hand 207, Element 602 moves robot gripper hand 207 vertically to align the hand vertically with the slot in the CAM 202 containing the desired media cartridge, Element 603 extends robot gripper hand 207, Element 604 grips the desired media cartridge, Element 605 retracts robot gripper hand 207 to retrieve the desired media cartridge from CAM 202, Element 606 moves robot gripper hand 207 vertically downward until it is aligned with the cartridge loading slot 209 of an available read/write device 205, Element 607 extends robot gripper hand 207 to insert the retrieved media cartridge into the available read/write device cartridge loading slot 209, Element 608 releases the grip on the desired media cartridge to permit further processing in read/write device 205, Element 609 retracts robot gripper hand 207, Element 610 completes the processing of the function to retrieve a cartridge from inventory.

To retrieve a media cartridge from a read/write device 205 when processing is completed and return the media cartridge to inventory, the elements as depicted in FIG. 7 are:

Element 701 moves robot gripper hand 207 vertically until it is aligned with the cartridge loading slot 209 of the read/write device 205 containing the desired media cartridge, Element 702 extends robot gripper hand 207 into cartridge loading slot 209 of the read/write device 205, Element 703 grips the media cartridge, Element 704 retracts robot gripper hand 207 retrieving the desired media cartridge from the read/write device 205, Element 705 rotates carousel 201 to align CAM 202 (which is to contain the desired media cartridge) with robot gripper hand 207, Element 706 moves robot gripper hand 207 vertically to align the hand vertically with the slot in CAM 202 where the desired media cartridge is to be returned to inventory, Element 707 extends robot gripper hand 207 into the slot in CAM 202, Element 708 release the grip on the media cartridge, Element 709 retracts robot gripper hand 207, Element 710 completes the processing of the function to retrieve a cartridge from a read/write device 205.

Figure 8:
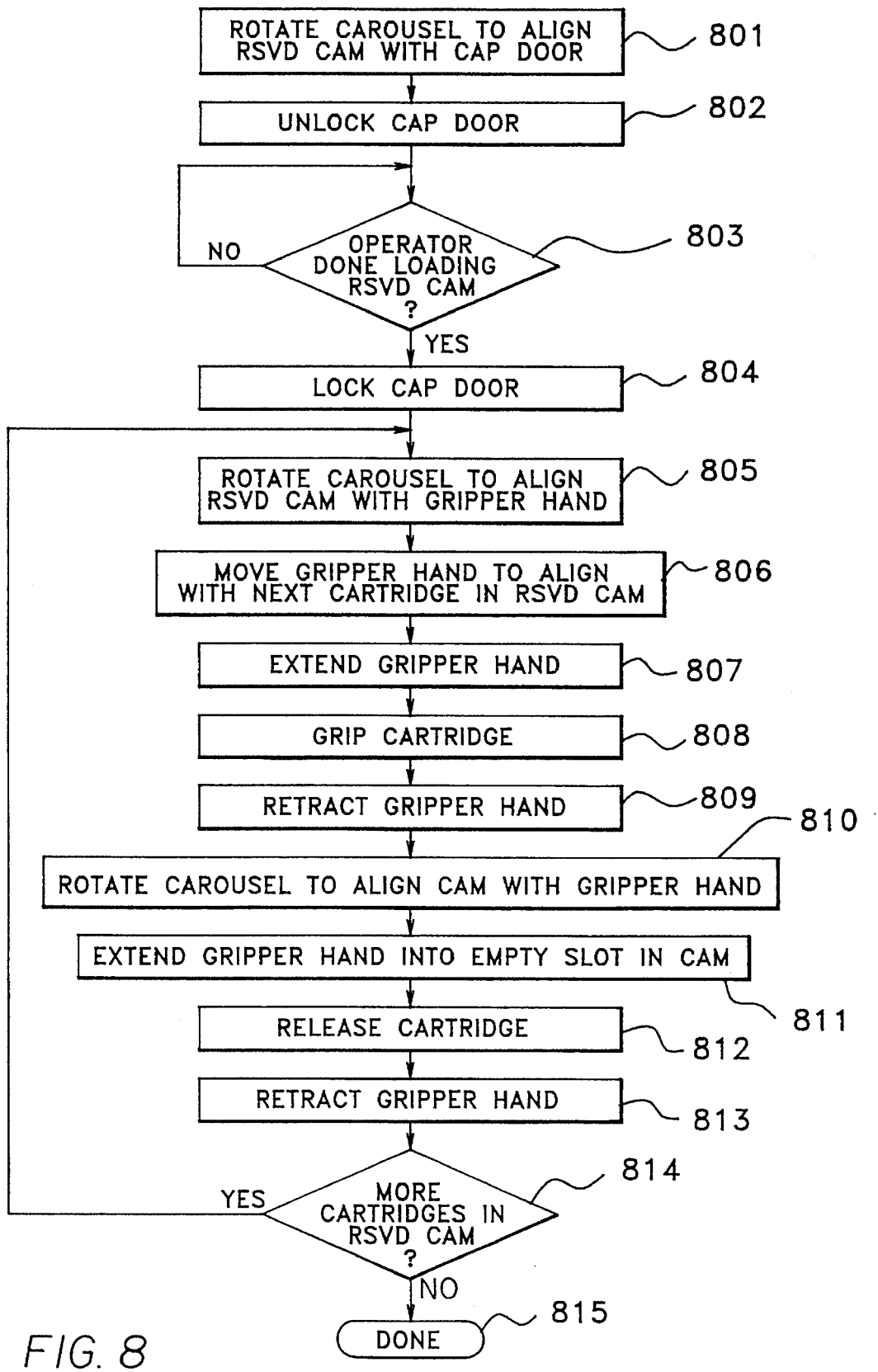
FIG. 8 shows the control function to add new media cartridges supplied by an operator through the CAP into the library inventory.

To add one or more new media cartridges supplied by a human operator into library inventory, the elements as depicted in FIG. 8 are:

Element 801 rotates carousel 201 so that reserved CAM 203 is aligned with CAP door 101 of FIG. 1, Element 802 unlocks CAP door 101 to permit human access, Element 803 waits for operator to indicate readiness, Element 804 locks CAP door 101 after the operator indicates readiness, Element 805 rotates carousel 201 so that reserved CAM 203 is vertically aligned with robot gripper hand 207, Element 806 moves robot gripper hand 207 vertically until it is vertically aligned with the next media cartridge loaded into reserved CAM 203 by the human operator, Element 807 extends robot gripper hand 207, Element 808 grips the desired media cartridge, Element 809 retracts robot gripper hand 207 to retrieve the desired media cartridge from reserved CAM 203, Element 810 rotates carousel 201 so that CAM 202 containing the desired empty slot for inventory storage of the media cartridge is vertically aligned with robot gripper hand 207, Element 811 extends robot gripper hand 207, Element 812 releases the grip on the new media cartridge, Element 813 retracts robot gripper hand 207, Element 814 causes the repetition of elements 805 through 814 if more media cartridges remain in reserved CAM 203, Element 815 completes the processing of the function to add new cartridges to the storage library inventory.

Figure 9:
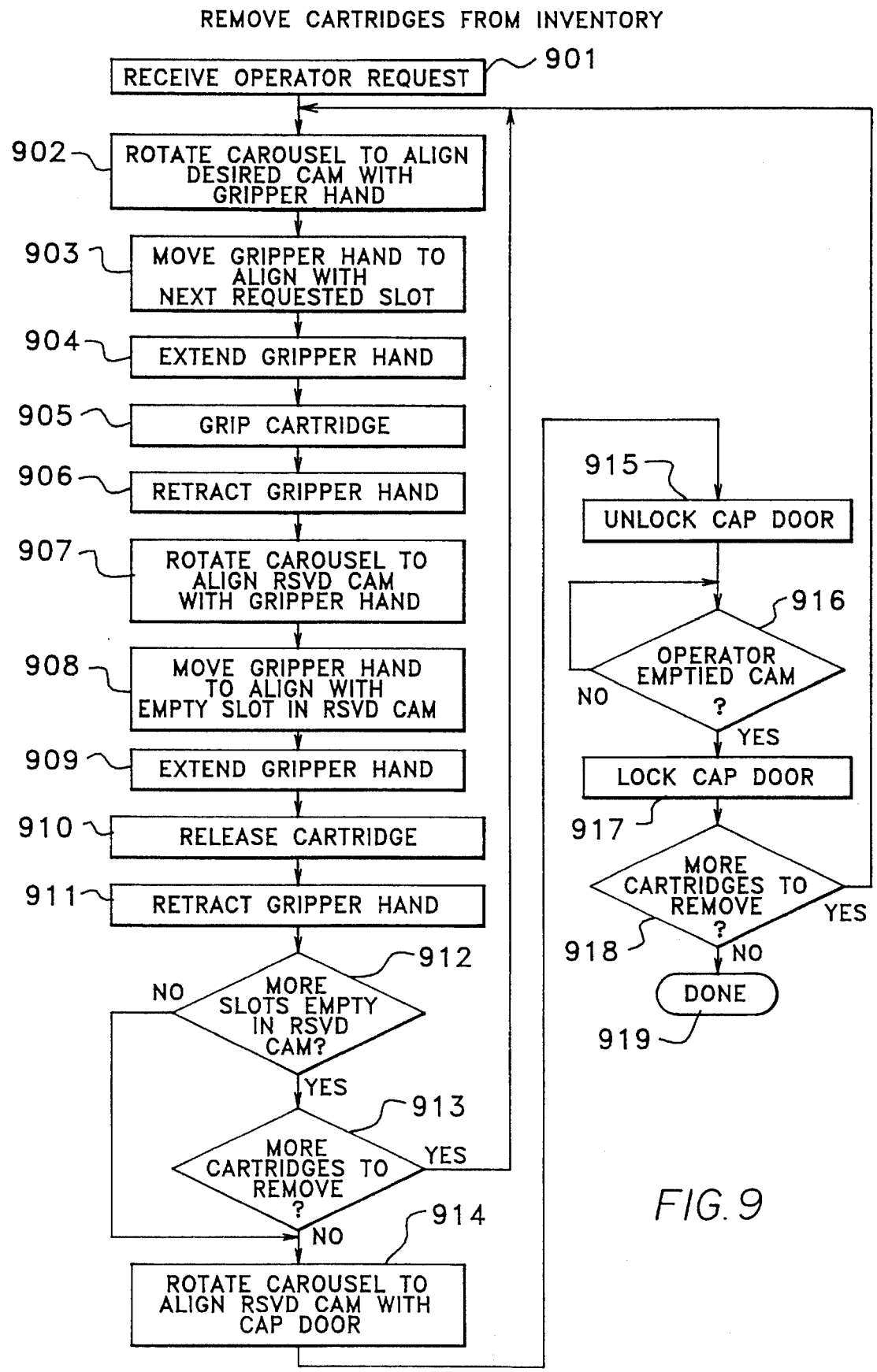
FIG. 9 shows the control function to remove media cartridges from the inventory of the library to be retrieved by an operator through the CAP.

To remove one or more media cartridges from library inventory to human operator access, the elements as depicted in FIG. 9 are:

Element 901 receives operator request to remove media cartridges from inventory, Element 902 responds to element 901 to rotate carousel 201 so that CAM 202 holding next requested media cartridge is vertically aligned with robot gripper hand 207, Element 903 moves robot gripper hand 207 vertically to align with the slot in CAM 202 containing the next requested media cartridge, Element 904 extends gripper hand, Element 905 grips desired media cartridge, Element 906 retracts gripper hand retrieving desired media cartridge from CAM 202, Element 907 rotates carousel 201 so that reserved CAM 203 is vertically aligned with robot gripper hand 207, Element 908 moves robot gripper hand 207 vertically to align with an empty slot in reserved CAM 203, Element 909 extends robot gripper hand 207 into empty slot of reserved CAM 203, Element 910 releases the grip on the media cartridge, Element 911 retracts robot gripper hand 207 from slot in reserved CAM 203, Element 912 causes processing of this function to continue at element 914 if there are no more empty slots in reserved CAM 203, Element 913 causes the repetition of elements 902 through 913 if there are more media cartridges to be removed as requested by the human operator, Element 914 rotates carousel 201 so that reserved CAM 203 is aligned with CAP door 101, Element 915 unlocks CAP door 101, Element 916 waits for operator to indicate reserved CAM is emptied of media cartridges to be removed, Element 917 locks CAP door 101, Element 918 causes the repetition of elements 902 through 913 if there are more media cartridges to be removed as requested by the human operator, Element 919 completes processing of the function to remove selected cartridges from the inventory of cartridges in storage library 100.

Carousel

Figure 10:
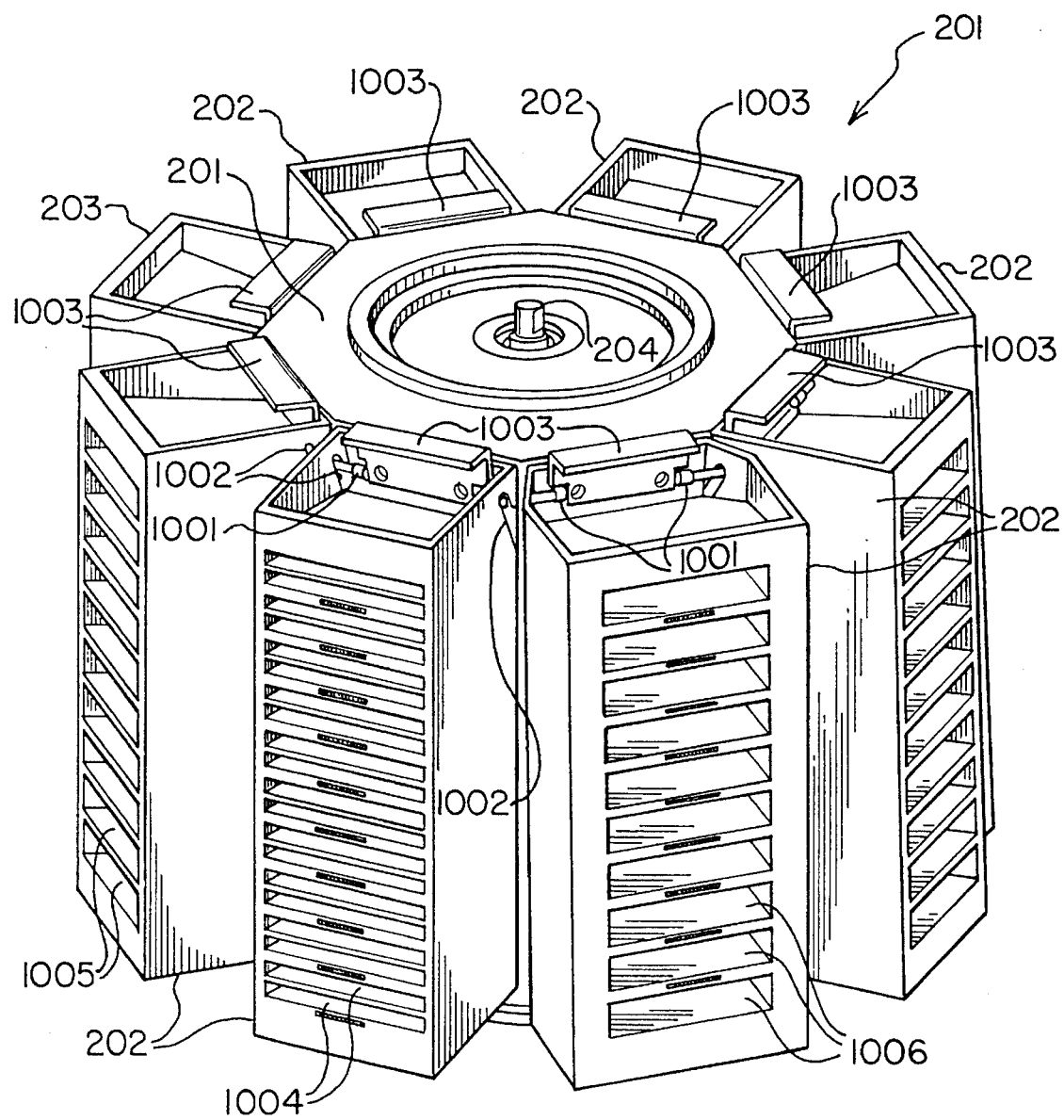
FIG. 10 shows a detailed view of the carousel with CAMs hanging in place.

FIG. 10 depicts additional detail of carousel 201. CAM positioning pins 1001 are affixed to each of the eight faces of the main body of carousel 201. CAM positioning slots 1002 in CAMs 202 and reserved CAM 203 slide over CAM positioning pins 1001. The pins and slots serve both to accurately position the CAMs and to support the CAMs as they hang on the faces of carousel 201. Each of CAMs 202 and reserved CAM 203 have a handle 1003 attached to the their tops to simplify removal or insertion of the CAMs into or out of the storage library 100.

Storage library 100 of the present invention is capable of processing a variety of different storage media formats and cartridges. In FIG. 10, Each CAM 202 or reserved CAM 203 comprises several slots for storing or transporting media cartridges. A variety of sizes and shapes of slots are depicted for storing several types of storage media cartridges. CAMs 202 of FIG. 10 are adapted to store one media cartridge type per CAM 202. In this case the operator may enter or remove cartridges through CAP door 101 (of FIG. 1) only by inserting a reserved CAM 203 which is capable of storing the media cartridge format to be added to or removed from storage library 100. Slots 1005 are adapted to store high capacity tape cartridges. Slots 1004 are adapted to store CDROM cartridges. Slots 1006 are adapted to store WORM or Read/Write Optical disk cartridges. Bar code labels 1007 on CAMs 202 or 203 are used to identify the type of media cartridges the CAM is adapted to receive. Bar code labels 305 of FIG. 3 on individual storage media cartridges are used in part to determine the type of media cartridge to be matched to an appropriate slot. Bar code reader 307 (of FIG. 3) is positioned as required to read bar code labels on media cartridges and slots. CPU 401 of FIG. 4 matches bar code labels from slots and media cartridges to determine a proper slot for storing a particular media cartridge in a CAM 202 or in reserved CAM 203.

Another alternative exemplary embodiment of the present invention (not shown) comprises CAMs wherein each CAM is capable of storing several types of media cartridges. Each slot of each CAM is adapted to store a particular size and format media cartridge.

The variety of slots in CAMs 202 and reserved CAM 203 as recited in the above alternative embodiments permits the storage library of the present invention to inventory a wide variety of storage media formats. Robot gripper hand 207 (of FIG. 3) is capable of manipulating a variety of storage media cartridge sizes and shapes. Read/write devices 205 (of FIG. 2) are adapted so that each may process a different type of storage media cartridge.

Local Media Storage

Local Media Storage 102 of FIG. 1 is a storage location integrated with the covers of storage library 100 for hanging extra CAMs 202 outside the inventory control of storage library 100. Hinged door 104 and handle 105 serve to cover and protect CAMs 202 stored in LMS 102. Bar code wand 106 is connected to control electronics 208 of FIG. 2 to aid in partially automating the inventory of the CAMs 202 and media cartridges stored in the LMS 102. When a host computer systems requests a storage media cartridge control electronics 208 (of FIG. 2) determines the location of the requested cartridge in the inventory recorded in memory 414 (of FIG. 4). If the cartridge is found in the recorded inventory, control electronics 208 manipulates the robotic mechanisms as described above to retrieve the requested cartridge for further processing. If the cartridge is not found in recorded inventory, control electronics determines whether the requested cartridge has been recorded in LMS 102 inventory. The operator records the inventory of LMS 102 by using bar code wand 106 to scan the bar code labels of cartridges stored in CAMs 202 hanging within LMS 102.

If control electronics 208 determines that the requested cartridge was last recorded in LMS 102 inventory then control electronics 208 prompts the operator to retrieve the cartridge from LMS storage and add it to the inventory of storage library 100 through CAP door 101.

Device Service Access Doors 103 of FIG. 1 provide offline service mode access to the electronic read/write devices (not shown) housed within storage library 100.

Alternative Exemplary Embodiment

Figure 11:
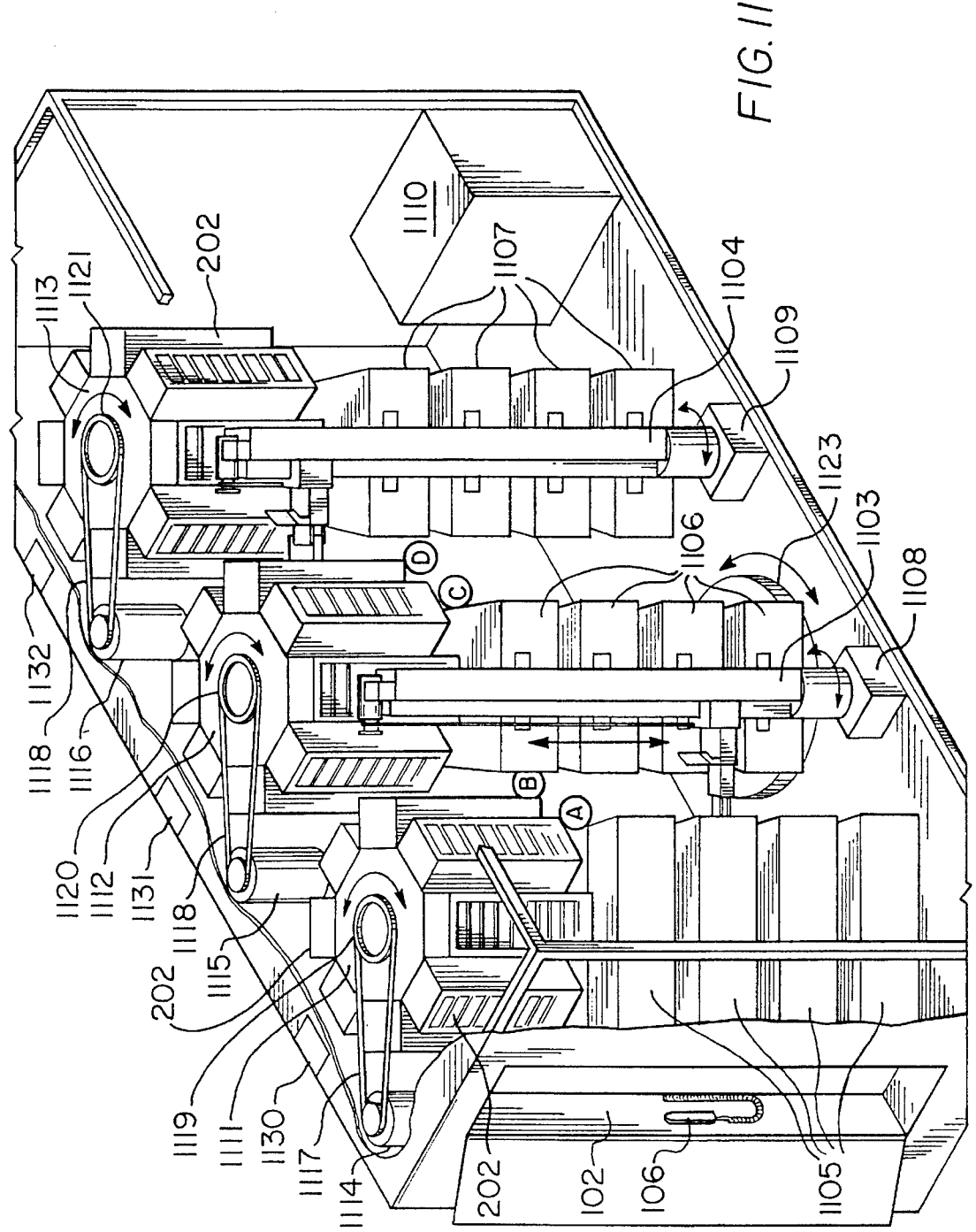
FIG. 11 depicts another possible exemplary embodiment of the storage library of the present invention wherein each of multiple robotic arms may rotate to service multiple carousels and read/write devices.

FIG. 11 depicts a perspective view of another possible exemplary embodiment of the present invention. In the embodiment of FIG. 11, robotic arms 1101 and 1102 are controllably rotated to one of four positions (labeled "A", "B", "C", and "D" in FIG. 11) to manipulate media cartridges in one of carousels 1111, 1112, and 1113. Robotic arm 1101 is rotated by servo motors 1108 under the control of control electronics 1110 to position "A" to manipulate media cartridges stored in carousel 1111 and rotated to position "B" to manipulate media cartridges stored in carousel 1112. Robotic arm 1102 is rotated by servo motors 1109 under the control of control electronics 1110 to position "C" to manipulate media cartridges stored in carousel 1112 and rotated to position "D" to manipulate media cartridges stored in carousel 1113.

Carousels 1111, 1112, and 1113 are controllably rotated by servo motors 1114, 1115, and 1116, respectively, under the control of control electronics 1110 to align a desired CAM 202 or reserved CAM 203 with the robotic arm 1101 (or 1102). Servo motors 1114, 1115, and 1116 turn belts 1117, 1118, and 1119, respectively, which in turn each rotate carousels 1111, 1112, and 1113 by turning belt gears 1119, 1120, and 1121 respectively.

Read/write devices 1106 are stacked one on top of another and are controllably rotated by servo motor 1123 to position "B" to align with robotic arm 1101 or to position "C" to align with robotic arm 1102. Read/write devices 1105 are similarly stacked one on top of another but are fixed in position "A" to align with robotic arm 1101. Read/write devices 1107 are similarly stacked on top of one another and fixed in position "D" to align with robotic arm 1102.

CAP doors 1130, 1131, and 1132 each provide limited operator access to carousels 1111, 1112, and 1113, respectively, using the methods discussed above.

In this embodiment of the present invention media cartridges may be moved among the slots of carousels 1111, 1112, and 1113 or between the carousels and any of drives 1105, 1106, and 1107. This feature permits additional flexibility in servicing host computer requests for media cartridges as well as providing additional capacity for storing media cartridges. A media cartridge stored in any slot of any CAM of any of carousels 1111, 1112, and 1113 can be retrieved and moved to any of read/write devices 1105, 1106, and 1107. This flexibility requires the addition of rotational movement to robotic arms 1101 and 1102 and to read/write devices 1106 not required in the aforementioned exemplary embodiments of the present invention. However, the additional rotational motion remains simpler than the broad range of motion required of prior designs. The robotic arms 1101 and 1102 and the read/write devices 1106 need only rotate to one of two discrete positions. Mechanical detents or other simple control mechanisms are applied to control this rotational motion.

This alternative exemplary embodiment can be easily extended to add additional carousels and robotic arms to further enhance the response of the storage library subsystem to host requests and to further enhance library capacity. Alternative embodiments can also extend the rotational motion of a robotic arm to service three or more carousels.

Alternative Embodiment Control Electronics

Figure 12:
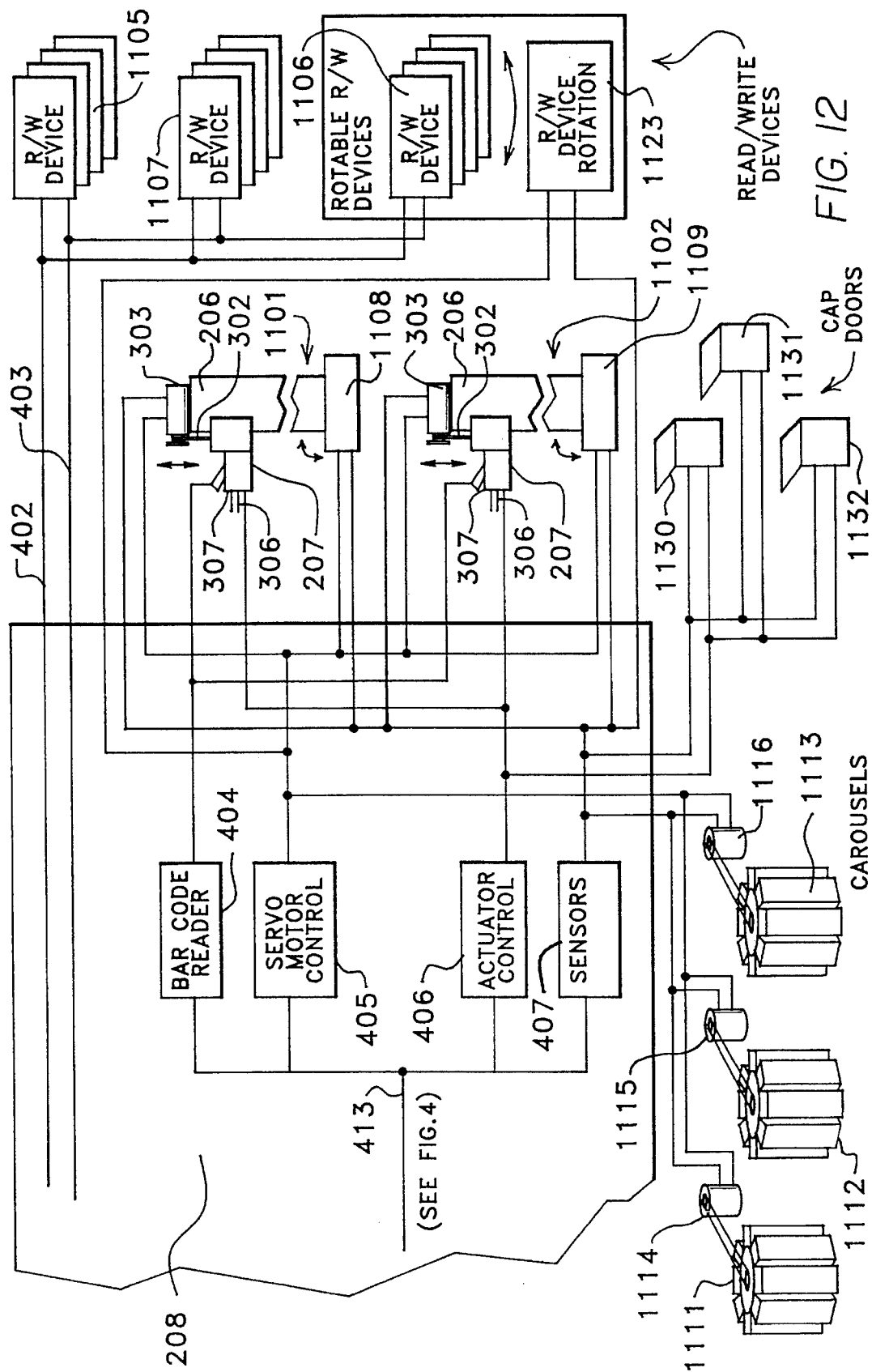
FIG. 12 is a block diagram of the control electronics within the storage library of FIG. 11.

FIG. 12 depicts a block diagram of control electronics 1110. FIG. 12 should be viewed in conjunction with FIG. 4. Control electronics 1110 of FIG. 12 is an extension of the capabilities on control electronics 208 of FIG. 4. Several features common to control electronics 208 and control electronics 1110 are left out of FIG. 12 so simplify the drawing. Control electronics 1110 of FIG. 12 extends the control functions of control electronics 208 by the addition of controls for the rotation of robotic arms 1101 and 1102, controls for the rotation of read/write devices 1106, and controls for the added carousels, CAP doors and robotic arms.

CPU 401 and read/write devices 1105, 1106, and 1107 receive command information from host computers 501 or HSM controller 503 and return status information over command channel 402. Data transferred between a host computer 501 or HSM controller 503 and storage media cartridges processed by read/write devices 1105, 1106, or 1107 is transferred over data channel 403. CPU 401 controls operation of the library subsystem by applying and sensing signals on bus 413. Operator panel control 410 and operator panel 412 are used to communicate instructions and status to a human operator. Keyboard control 409 and keyboard 411 are used to receive command input from a human operator. Bar code reader 408 and bar code wand 106 are used to read labels from media cartridges stored in CAMs within Local Media Storage 102 of FIG. 11. Further details regarding Local Media Storage 102 and bar code wand 106 are discussed above.

CPU 401 controls operation of robotic mechanisms of the library subsystem over bus 413. Bar code reader 404 is used with bar code scanners 307 to create and verify the inventory of media cartridges within storage library 100 when new media cartridges are added by a human operator through CAP doors 1130, 1131, or 1132. Bar code scanners 307 are each affixed to one of robot gripper hands 207 so that as robot gripper hands 207 are positioned to retrieve a media cartridge, bar code scanners 307 can verify the identity of the media cartridge by reading the bar code label on the media cartridge. CPU 401 uses bar code reader 404 and bar code scanners 307 to read each media cartridge label as new media cartridges are added to inventory by a human operator through CAP doors 1130, 1131, or 1132. CPU 401 records the label information read and the ultimate inventory location for the media cartridge in memory 4 14. When a host computer system requests a particular media cartridge by identifying the label information, CPU 401 looks up the inventory location for the requested media cartridge in memory 414 and controls the robotic mechanisms of storage library 100 to retrieve the media cartridge for processing in one of read/write devices 1105, 1106, and 1107.

CPU 401 controls servo motors 303 through commands sent to servo motor control 405 over bus 413. Servo motors 303 are activated to turn belt 302 to slide robot gripper hands 207 vertically up or down on robot z-axis supports 206 to align robot gripper hands 207 with a slot in a CAM 202 or reserved CAM 203 or with a cartridge loading slot 209 in one of read/write devices 1105, 1106, or 1107. Servo motors 1114, 1115, or 1116 are activated to rotate one of carousels 1111, 1112, or 1113, respectively, to align a CAM 202 or a reserved CAM 203 on the carousel with one of robot gripper hands 207 or with one of CAP doors 1130, 1131, or 1132.

CPU 401 senses positions of robotic mechanisms of storage library 100 by reading information from sensors 407 as well as the servo encoder mechanisms of all servo motors. Sensors 407 can sense whether any of CAP doors 1130, 1131, or 1132 are opened or closed. Additionally, sensors 407 can sense the top and bottom vertical motion limits of robot gripper hands 207 on robot z-axis supports 206. Sensing the position of CAP doors 1130, 1131, or 1132 is useful for CPU 401 to determine when carousels 1111, 1112, or 1113 may safely be rotated without interference from or harm to a human operator. CPU 401 will only rotate a carousel 1111, 1112, or 1113 when the corresponding CAP door 1130, 1131, or 1132 is closed and locked. Sensing the position of robot gripper hands 207 or carousels 1111, 1112, or 1113 is useful for CPU 401 to calibrate the operation of all servo motors.

CPU 401 controls gripper jaws 306 and CAP door locks (not shown) through commands sent to actuator control 406 over bus 413. Actuator control 406 may controllably lock or unlock CAP doors 1130, 1131, and 1132. A human operator is permitted to access reserved the CAM 203 of each carousel 1111, 1112, or 1113 through corresponding CAP door 1130, 1131, or 1132 only when CPU 401 unlocks the required CAP door 1130, 1131, or 1132. At all other times CAP doors 1130, 1131, and 1132 remain locked to prevent human operator access to the CAMs and to prevent harm to the operator from the rotation of the carousels. CPU 401 also causes gripper jaws 306 to be extended, retracted, opened or closed by activating actuators (not shown) through commands sent to actuator control 406 over bus 413.

Control electronics 1110 also controls the rotational motion of robotic arms 1101 and 1102 as well as rotation of read/write devices 1106 in this alternative embodiment of the present invention. Servo motors 1108 and 1109 are controlled by servo motor control 405 and CPU 401 to rotate robotic arms 1101 and 1102 respectively to align with one of carousels 1111, 1112, and 1113 or to align with one of read/write devices 1105, 1106, and 1107. Servo motor control 405 and CPU 401 also control the rotation of read/write devices 1106 by servo motor 1123. Read/write devices 1106 are rotated to align with either of robotic arms 1101 and 1102. CPU 401 senses rotational positions of robotic arms 1101 and 1102 and read/write devices 1106 by reading information from sensors 407 as well as the servo encoder mechanisms of all servo motors.

It is expressly understood that the claimed invention is not to be limited to the description of the preferred embodiment but encompasses other modifications and alterations within the scope and spirit of the inventive concept.

I claim:

1. A simplified storage library subsystem comprising:

magazine means having a plurality of slots for storing storage media cartridges, each of said slots being adapted to receive one of said storage media cartridges;

carousel means for rotatably holding a plurality of said magazine means wherein said magazine means includes a plurality of active magazine means and at least one reserve magazine means, each of said plurality of said magazine means being positioned parallel to a first plane, said carousel means having a storage media selection position aligned with said first plane;

non-rotatable robotic gripper means for seeking said storage media cartridges along said first plane, and gripping and releasing said storage media cartridges along an intersect line of a second plane and said first plane, said first plane being substantially perpendicular to said second plane;

at least one read/write device means for recording and retrieving information on said storage media cartridges, each of said at least one read/write device means being aligned in said first plane;

carousel control means for controllably rotating said carousel means to align one of said plurality of said magazine means at a time with said storage media selection position;

robot control means for controllably moving said robotic gripper means along said first plane;

gripper control means for controllably moving said robotic gripper means along said second plane and causing said robotic gripper means to grip one of said storage media cartridges and release one of said storage media cartridges;

access means to permit controlled access by an operator to one of said at least one reserve magazine means at a time for adding or removing said storage media cartridges therefrom by way of an access port; and processing means cooperatively engaged with said carousel control means, with said robot control means, with said access means, and with said gripper control means for controllably gripping, releasing, and moving said storage media cartridges from a first position within said storage library subsystem to a second position within said storage library subsystem.

2. The apparatus of claim 1 further comprising:

operator input means cooperatively engaged with said processing means for receiving requests from said operator relating to operation of said storage library subsystem; and operator output means cooperatively engaged with said processing means for informing said operator regarding status or operation of said storage library subsystem.

3. The apparatus of claim 2 wherein said operator input means further comprises:

keypad means for receiving requests from said operator.

4. The apparatus of claim 2 wherein said operator output means further comprises:

display means for displaying information to said operator regarding status or operation of said storage library subsystem.

5. The apparatus of claim 1 further comprising:

communication means cooperatively engaged with said processing means and with said read/write device means for exchange of status, command, and data between said storage library subsystem and a host system, wherein said status and command information relate to operation of said storage library subsystem; and wherein said data relates to information to be stored on, or retrieved from, said storage media cartridges by said read/write device means.

6. The apparatus of claim 1 further comprising:

a plurality of types of read/write device means for storing and retrieving information on a corresponding plurality of types of storage media housed within a corresponding plurality of types of storage media cartridges, wherein said slots in said magazine means are each adapted to receive any one of said plurality of types of storage media cartridges;

wherein each of said plurality of types of read/write device means is adapted to receive one type of said plurality of types of storage media cartridges and to retrieve and record information thereon;

wherein at least one of said plurality of types of read/write device means is adapted to receive and retrieve and record information on each one type of said plurality of types of storage media cartridges; and wherein said robotic gripper means is adapted to grip and release any of said plurality of types of storage media cartridges.

7. The apparatus of claim 6:

wherein each of said plurality of types of storage media is selected from the group consisting of: magnetic tape, CDROM, WORM disk, read/write optical disk, magnetic disk, and disk array.

8. The apparatus of claim 1 wherein said access means and access port further comprises:

said access port being substantially similar in size to said magazine means;

door means having an open position and a closed position for controlling said operator access to said reserve magazine means through said access port, said open position being adapted to permit hand access only by said operator, said closed position being adapted to prevent said operator from accessing said storage media cartridges; and lock means for controllably preventing said door means from being moved to said open position so as to prevent said operator from accessing said storage media cartridges.

9. The apparatus of claim 8 further comprising:

first lock means cooperatively engaged with said door means and with said carousel control means to prevent said door means from opening while said carousel means is rotating; and second lock means cooperatively engaged with said door means and with said processing means to open said door means when one of said at least one reserve magazine means is aligned with said access port.

10. The apparatus of claim 1 further comprising:

local media storage means independent of said carousel means for storing additional storage media cartridges; and operator display means cooperatively engaged with said processing means for communicating to a human operator the possibility that a particular one of said additional storage media cartridges is located in said local media storage means.

11. The apparatus of claim 10 further comprising:

cartridge identification means cooperatively engaged with said processing means for uniquely identifying each of said additional storage media cartridges stored within said local media storage means.

12. The apparatus of claim 11 wherein said cartridge identification means comprises:

bar code labels affixed to each of said additional storage media cartridges stored in said local media storage means for associating identification information with each of said additional storage media cartridges means stored in said local media storage means;

bar code reading means cooperatively engaged with said processing means for reading said identification information from said bar code labels;

memory means associated with said processing means for recording said identification information, said recorded identification information to be used by said processing means to communicate through said operator display means regarding the possible location of said additional storage media cartridges within said local media storage means.

13. The apparatus of claim 1 wherein:

said carousel means further comprises a plurality of carousels each independently rotatable by said carousel control means; and said robotic gripper means further comprises a plurality of robotic grippers each independently moveable by said robot control means.

14. The apparatus of claim 13 further comprising:

read/write device rotation means cooperatively engaged with said processing means for rotating said read/write device means to align said read/write device means with one of said plurality of robotic grippers.

15. An apparatus for limiting a human operator's access to storage media cartridges stored in a storage library subsystem for purposes of adding or removing said storage media cartridges in said storage library subsystem, said apparatus comprising:

door means in said storage library subsystem having an open position adapted to permit the operator to access a limited number of storage media cartridges in said storage library subsystem and a closed position adapted to prevent the operator from accessing said storage media cartridges in said storage library subsystem;

lock means cooperatively engaged with said door means for controllably maintaining said door means in said closed position to prevent the operator from accessing said storage media cartridges;

access control means cooperatively engaged with said door means and with said lock means for allowing the operator to access said limited number of storage media cartridges only when said moveable means is in a stationary first position and for preventing the operator from accessing said storage media cartridges when said moveable means is not in said stationary first position;

a plurality of magazine means each having a plurality of slots, each said slot being adapted to receive one of said storage media cartridges, a subset of said slots being designated as reserved for operator access to transfer storage media cartridges into or out of said storage library subsystem;

rotatable carousel means within said storage library subsystem for holding said plurality of magazine means;

carousel control means cooperatively engaged with said access control means for controllably rotating said rotatable carousel means, wherein said lock means are operable by said access control means to unlock said door means only when the reserved subset of said slots is rotated on said carousel means by said carousel control means into said stationary first position aligned with said door means to permit the operator to access the reserved subset of said slots; and wherein said lock means are further operable by said access control means to lock said door means when said carousel means is not in said stationary first position in alignment with said door means.

16. An apparatus for semi-automatic inventory control of additional storage media cartridges stored independent of storage within a storage library subsystem, said storage library subsystem comprising:

internal storage means for storing storage media cartridges within said storage library subsystem;

manipulator means for controllably moving said storage media cartridges among various locations internal to said storage library subsystem;

communication means for requesting manipulation of a particular one of said storage media cartridges; and control means cooperatively engaged with said manipulator means, with said internal storage means, and responsive to requests from said communication means for retrieving a specific one of said storage media cartridges for further processing within said storage library subsystem, said apparatus comprising:

external storage means independent of said internal storage means for storing said additional storage media cartridges;

inventory identification means associated with said additional storage media cartridges and cooperatively engaged with said control means for uniquely identifying each one of said storage media cartridges;

memory means cooperatively engaged with said control means for recording information derived from said inventory identification means associated with said additional storage media cartridges in said external storage means; and operator information means cooperatively engaged with said control means for communicating with a human operator that a particular one of said additional storage media cartridges requested by said communication means is located in said external storage means requiring operator intervention to retrieve said requested additional storage media cartridge.

17. The apparatus of claim 16 wherein said inventory identification means comprises:

bar code labels affixed to each of said additional storage media cartridges stored in said external storage means for associating identification information with each of said additional storage media cartridge; and bar code reading means cooperatively engaged with said control means for reading information from said bar code labels.

18. A method for adding new storage media cartridges to a storage media cartridge inventory in a storage library subsystem, said storage library subsystem comprising:

rotatable carousel means having a plurality of slots, each said slot being adapted to hold one of said storage media cartridges, a portion of said slots being reserved for temporary storage of said new storage media cartridges;

cartridge access port means for permitting controlled human operator access to a limited number of said storage media cartridges during normal operation of said storage library subsystem;

door means for controllably covering said cartridge access port means to limit human operator access to said storage media cartridges, said door means having an open position to permit said human operator to access said limited number of said storage media cartridges through said cartridges access port means, said door means further having a closed position covering said cartridge access port means to prevent said human operator from accessing said storage media cartridges;

lock means cooperatively engaged with said door means for controllably restricting movement of said door means, said lock means being adapted to controllably lock said door means to prevent said door means from moving to said open position so as to preclude human operator access to said media cartridges, said lock means being further adapted to controllably unlock to permit said door means to be moved to said open position so as to permit said human operator to access said limited number of said storage media cartridges;

read/write device means to record information on, and to retrieve information from said storage media cartridges;

moveable robotic gripper means for controllably moving said storage media cartridges within said storage library subsystem;

operator input means for receiving input from said human operator regarding operation of said storage library subsystem; and control means cooperatively engaged with said rotable carousel means, with said cartridge access port means, with said door means, with said lock means, with said moveable robotic gripper means, and with said operator input means for controllably gripping, releasing, and moving said storage media cartridges from a first position within said storage library subsystem to a second position within said storage library subsystem, said method comprising the steps of:

rotating said rotable carousel means so that only said reserved slots are aligned with said cartridge access port means;

controlling said locking means to unlock said door means to permit said human operator to access said reserved slots through said cartridge access port means;

waiting for said human operator to indicate through said operator input means completion of access to said reserved locations to add said new storage media cartridges to said reserved slots;

controlling said locking means to lock said door means to prevent said human operator from accessing said media cartridges; and activating said moveable robotic gripper means and said rotable carousel means to move said new storage media cartridges from said reserved slots in said rotable carousel means to other slots in said rotable carousel means.

19. A method for removing storage media cartridges from a storage media cartridge inventory in a storage library subsystem, said storage library subsystem comprising:

rotatable carousel means having a plurality of slots, each said slot being adapted to hold one of said storage media cartridges, a portion of said slots being reserved for temporary storage of said storage media cartridges;

cartridge access port means for permitting controlled human operator access to said storage media cartridges during normal operation of said storage library subsystem;

door means for controllably covering said cartridge access port means to limit human operator access to said storage media cartridges, said door means having an open position to permit said human operator to access a limited number of said storage media cartridges through said cartridges access port means, said door means further having a closed position covering said cartridge access port means to prevent said human operator from accessing said storage media cartridges;

lock means cooperatively engaged with said door means for controllably restricting movement of said door means, said lock means being adapted to controllably lock said door means to prevent said door means from moving to said open position so as to preclude human operator access to said media cartridges, said lock means being further adapted to controllably unlock to permit said door means to be moved to said open position so as to permit said human operator to access said storage media cartridges;

read/write device means to record information on, and to retrieve information from said storage media cartridges;

moveable robotic gripper means for controllably moving said storage media cartridges within said storage library subsystem;

operator input means for receiving input from said human operator regarding operation of said storage library subsystem; and control means cooperatively engaged with said rotable carousel means, with said cartridge access port means, with said door means, with said lock means, with said moveable robotic gripper means, and with said operator input means for controllably gripping, releasing, and moving said storage media cartridges from a first position within said storage library subsystem to a second position within said storage library subsystem, said method comprising the steps of:

waiting for said human operator to indicate through said operator input means which of said storage media cartridges stored within said storage library subsystem are to be removed;

activating said moveable robotic gripper means and said rotable carousel means to move said indicated storage media cartridges from slots in said rotable carousel means to said reserved slots in said rotable carousel means rotating said rotable carousel means so that only said reserved slots are aligned with said cartridge access port means;

controlling said locking means to unlock said door means to permit said human operator to access said reserved slots through said cartridge access port means;

waiting for said human operator to indicate through said operator input means completion of access to said reserved locations to remove said indicated storage media cartridges from said reserved slots; and controlling said locking means to lock said door means to prevent said human operator from accessing said media cartridges.

* * * * *